US010033723B2

(12) United States Patent
Hirst et al.

(10) Patent No.: US 10,033,723 B2
(45) Date of Patent: Jul. 24, 2018

(54) METHODS, DEVICES, AND COMPUTER READABLE STORAGE DEVICES FOR AUTHENTICATING DEVICES HAVING NON-SIM BASED CLIENTS

(71) Applicant: AT&T Intellectual Property I, L.P., Atlanta, GA (US)

(72) Inventors: Timothy Hirst, Austin, TX (US); Siroos K. Afshar, Englishtown, NJ (US); Paritosh Bajpay, Edison, NJ (US); Pradeep Khowash, Marlboro, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 88 days.

(21) Appl. No.: 14/133,590

(22) Filed: Dec. 18, 2013

(65) Prior Publication Data
US 2015/0172315 A1 Jun. 18, 2015

(51) Int. Cl.
G06F 7/04 (2006.01)
H04L 29/06 (2006.01)

(52) U.S. Cl.
CPC ............ *H04L 63/083* (2013.01); *H04L 63/08* (2013.01); *H04L 63/0861* (2013.01); *H04L 65/1016* (2013.01); *H04L 65/1073* (2013.01); *H04L 65/1006* (2013.01)

(58) Field of Classification Search
CPC .. H04L 63/168; H04L 63/0861; H04L 63/083
See application file for complete search history.

(56) References Cited

U.S. PATENT DOCUMENTS

| 7,685,293 | B2 | 3/2010 | Despande et al. |
| 7,796,990 | B2 | 9/2010 | Matuszewski et al. |
| 8,316,082 | B2 | 11/2012 | Igarashi |

(Continued)

FOREIGN PATENT DOCUMENTS

| CA | 2815069 | 5/2012 |
| FR | 2887721 | 12/2006 |

(Continued)

OTHER PUBLICATIONS

Ntantogian et al. "Reducting the User Authentication Cost in Next Generation Networks", Wireless on Demand Network Systems and Services, 8 pp (2008).

(Continued)

*Primary Examiner* — Mohammed Waliullah
(74) *Attorney, Agent, or Firm* — Scott P. Zimmerman, PLLC

(57) ABSTRACT

A communication device including a non-SIM based client is authenticated for accessing an IMS network. An internet protocol identity is received from the communication device. The internet protocol identity is not associated with a SIM. Authentication information associated with the internet protocol identity is requested and received from the communication device. A determination is made whether the communication device is authenticated based on the internet protocol identity and the authentication information. If the communication device is determined to be authenticated, the communication device is allowed access to the IMS network.

13 Claims, 5 Drawing Sheets

(56) References Cited

U.S. PATENT DOCUMENTS

| | | | |
|---|---|---|---|
| 8,346,976 B2 | 1/2013 | Bouthemy et al. | |
| 8,463,264 B2 | 6/2013 | Alriksson et al. | |
| 8,478,886 B2 | 7/2013 | Despande et al. | |
| 8,776,214 B1* | 7/2014 | Johansson | H04L 63/0823 713/170 |
| 8,934,383 B1* | 1/2015 | McConkey | H04L 65/1006 370/260 |
| 2004/0196796 A1 | 10/2004 | Bajko et al. | |
| 2005/0060551 A1* | 3/2005 | Barchi | H04L 63/08 713/182 |
| 2007/0028299 A1* | 2/2007 | Albano | 726/5 |
| 2008/0168540 A1* | 7/2008 | Agarwal | H04W 4/02 726/5 |
| 2008/0244266 A1* | 10/2008 | Cai | H04L 9/3271 713/170 |
| 2009/0193469 A1 | 7/2009 | Igarashi | |
| 2010/0217837 A1 | 8/2010 | Ansari et al. | |
| 2010/0263032 A1* | 10/2010 | Bhuyan | H04L 63/061 726/7 |
| 2010/0312897 A1 | 12/2010 | Allen et al. | |
| 2011/0040836 A1 | 2/2011 | Allen et al. | |
| 2011/0107436 A1* | 5/2011 | Cholas | H04N 21/2541 726/29 |
| 2011/0200022 A1 | 8/2011 | Annamalai | |
| 2012/0128006 A1 | 5/2012 | Petersson et al. | |
| 2013/0111570 A1* | 5/2013 | Kaariainen | H04L 63/08 726/5 |
| 2013/0227651 A1* | 8/2013 | Schultz | G06F 21/32 726/4 |
| 2014/0123263 A1* | 5/2014 | Thun | G06F 21/43 726/7 |
| 2015/0033300 A1* | 1/2015 | Timariu | H04L 63/168 726/5 |
| 2015/0156208 A1* | 6/2015 | Kirkham | H04L 63/126 726/4 |

FOREIGN PATENT DOCUMENTS

| | | |
|---|---|---|
| FR | 2985135 | 6/2013 |
| WO | 2010006643 | 1/2010 |
| WO | 2010102259 | 9/2010 |

OTHER PUBLICATIONS

Dragoi et al. "Enabling Network Convergence Through Contextual Session Mobility With IMS", Intl J Multimedia & its Applications, 3(2):12-31 (May 2011).

Copeland, Rebecca, "FMC-HSS—The IMS Brain", Huawei Technologies Ltd. (2009).

Abid et al. "Integrating Identity-Based Cryptography in IMS Service Authentication", Intl J Network Security & its Applications, 1(3):1-13 (Oct. 2009).

* cited by examiner

METHODS, DEVICES, AND COMPUTER READABLE STORAGE DEVICES FOR AUTHENTICATING DEVICES HAVING NON-SIM BASED CLIENTS

TECHNICAL FIELD

The present disclosure relates generally to telecommunications, and, more particularly, to authenticating communication devices.

BACKGROUND

The IP Multimedia Subsystem (IMS) is a standardized networking architecture for the $3^{rd}$ Generation Partnership Project (3GPP) network and future generation mobile networks. The IMS provides users of mobile communication devices with mobile and fixed multimedia services, such as application services. The IMS runs over the standard Internet Protocol (IP), using a Voice-over-IP (VoIP) protocol based on a 3GPP standardized implementation of Session Initiation Protocol (SIP). SIP is a protocol developed for initiating, modifying and terminating an interactive user session that involves multimedia elements, such as video, voice, instant messaging, gaming, and virtual reality.

The IMS architecture enables a user of a mobile communication device to connect to an IMS network, regardless of what access network the user is using, as long as the access network supports IP. Accordingly, an IMS network can be accessed via any network with packet-switching functionality, such as General Packet Radio Service (GPRS), Universal Mobile Telecommunications System (UMTS), Code Division Multiple Access (CDMA), Wireless Local Area Network (WLAN), WiMax, Digital Subscriber Line (DSL), cable, etc. Also, the IMS network may be accessed through circuit-switched telephone systems, like the Public Switched Telephone Network (PSTN) and the Global System for Mobile Communications (GSM), that are supported through appropriate gateways. Direct IMS terminals, such as mobile phone personal digital assistants (PDAs), computers, etc., can register directly into an IMS network, as long as they support SIP agents.

An important aspect of the IMS is enhanced user mobility, which allows operators and service providers to use different underlying network architectures, such that the mobile network provides terminal mobility (roaming), but user mobility is provided by the IMS and the SIP.

In a conventional 3GPP network, a user and his or her mobile communication device are identified and authenticated using identifiers including an International Mobile Subscriber Identity (IMSI), which is a unique user identity of a Universal Subscriber Identity Module (USIM) of the mobile terminal, and a Mobile Subscriber ISDN Number (MSIISDN), which is the actual telephone number of the user. The USIM is an application that runs on the universal integrated circuit card (UICC) of the mobile communication device. The UICC is commonly referred to as the Subscriber Identity Module (SIM) card.

The authentication model used in the current IMS architecture is patterned after the conventional 3GPP network. In the current IMS architecture, a user and his or her mobile communication device are identified and authenticated using identities including an Internet Protocol Multimedia Private Identity (IMPI) and an Internet Protocol Multimedia Public Identity (IMPU). Instead of phone numbers, these identifiers typically include Uniform Resource Identifiers (URIs). The IMPI is the private identity of the Internet Protocol Multimedia Service Identity Module (ISIM), which is an application than runs on the UICC of the mobile communication device. The IMPI is unique to the terminal device, but a user may have multiple IMPUs per IMPI.

The user database of the IMS, also referred to as the Home Subscriber Server (HSS) contains at least the IMPU, the IMPI, the IMSI, and the MSIISDN. During registration of a mobile communication device to the IMS, the IMPI and the IMPU are sent with registration requests to the IMS. The IMPI is authenticated to confirm the identity of the user using the IMPU to gain access to the IMS.

As noted above, the IMSI has traditionally been stored securely in the UICC or SIM card of a mobile terminal. By default, the IMPI has also been stored in the UICC or SIM card.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to one embodiment, a method is provided for authenticating a communication device having a non-SIM based client. The method includes, receiving an internet protocol identity from the communication device. The Internet protocol identity is not associated with a subscriber identity module. The method further includes requesting authentication information associated with the internet protocol identity from the communication device, receiving the authentication information from the communication device, and determining whether the communication device is authenticated based on the Internet protocol identity and the authentication information. The method further includes allowing the communication device access to an internet protocol multimedia subsystem responsive to determining that the communication device is authenticated.

According to another embodiment, a device is provided for authenticating a communication device having a non-SIM based client. The device includes a processor a memory. The memory has stored thereon instructions which, when executed by the processor, cause the processor to perform operations. The operations include receiving an internet protocol identity from the communication device. The internet protocol identity is not associated with a subscriber identity module. The operations further include requesting authentication information associated with the internet protocol identity from the communication device, receiving the authentication information from the communication device, and determining whether the communication device is authenticated based on the internet protocol identity and the authentication information. The operations further include allowing the communication device access to an Internet protocol multimedia subsystem responsive to determining that the communication device is authenticated.

According to another embodiment, a computer readable storage device is provided within a communication device having a non-SIM based client. The computer readable storage device has instructions stored thereon which, when executed by a processor within the communication device, cause the processor to perform operations. The operations include sending an internet protocol identity to a network component of an internet protocol multimedia system. The Internet protocol identity is not associated with a subscriber identity module. The operations further include receiving a request for authentication information associated with the internet protocol identity from the network component and sending the authentication information to the network component. The network component determines whether the communication device is authenticated based on the internet protocol identity and the authentication information. Responsive to the network component determining that the communication device is authenticated, the communication device is allowed access to the internet protocol multimedia subsystem.

DETAILED DESCRIPTION

Detailed exemplary embodiments are disclosed herein. It must be understood that the embodiments described and illustrated are merely examples that may be embodied in various and alternative forms, and combinations thereof. As used herein, the word "exemplary" is used expansively to refer to embodiments that serve as examples or illustrations. The figures are not necessarily to scale and some features may be exaggerated or minimized to show details of particular components. Specific structural and functional details disclosed herein are not to be interpreted as limiting.

As indicated above, the IMPI, which is used to authenticate a mobile communication device accessing the IMS, has, by default, been stored in the UICC of a communication device, in a manner similar to the way in which an IMSI, which is used to authentication a mobile communication device accessing a 3GPP network, is stored in the UICC of the mobile communication device. This practice has been carried over to authentication of communication devices that do not include UICC's, such as laptops. While IMPIs and IMPUs are useful for authenticating mobile communication devices including SIM cards, they are not efficient for authentication of non-SIM based clients, such as applications running on computers that do not include SIM cards.

Authentication of mobile communication devices having IMPIs and IMPUs stored in SIM cards desiring to access the IMS is not complicated. It merely involves authentication of the IMPI, the IMPU and a shared secret key with the HSS via other components of the IMS. However, conventional authentication of communication devices desiring to access the IMS that do not have the IMPI and the IMPU stored in SIM cards is extremely complicated. It requires the use of a shared secret key and mapping of a hypertext transfer protocol (HTTP) username and password to an IMPI and an IMPU, in addition to authentication of the IMPI and IMPU.

Figure 1A:
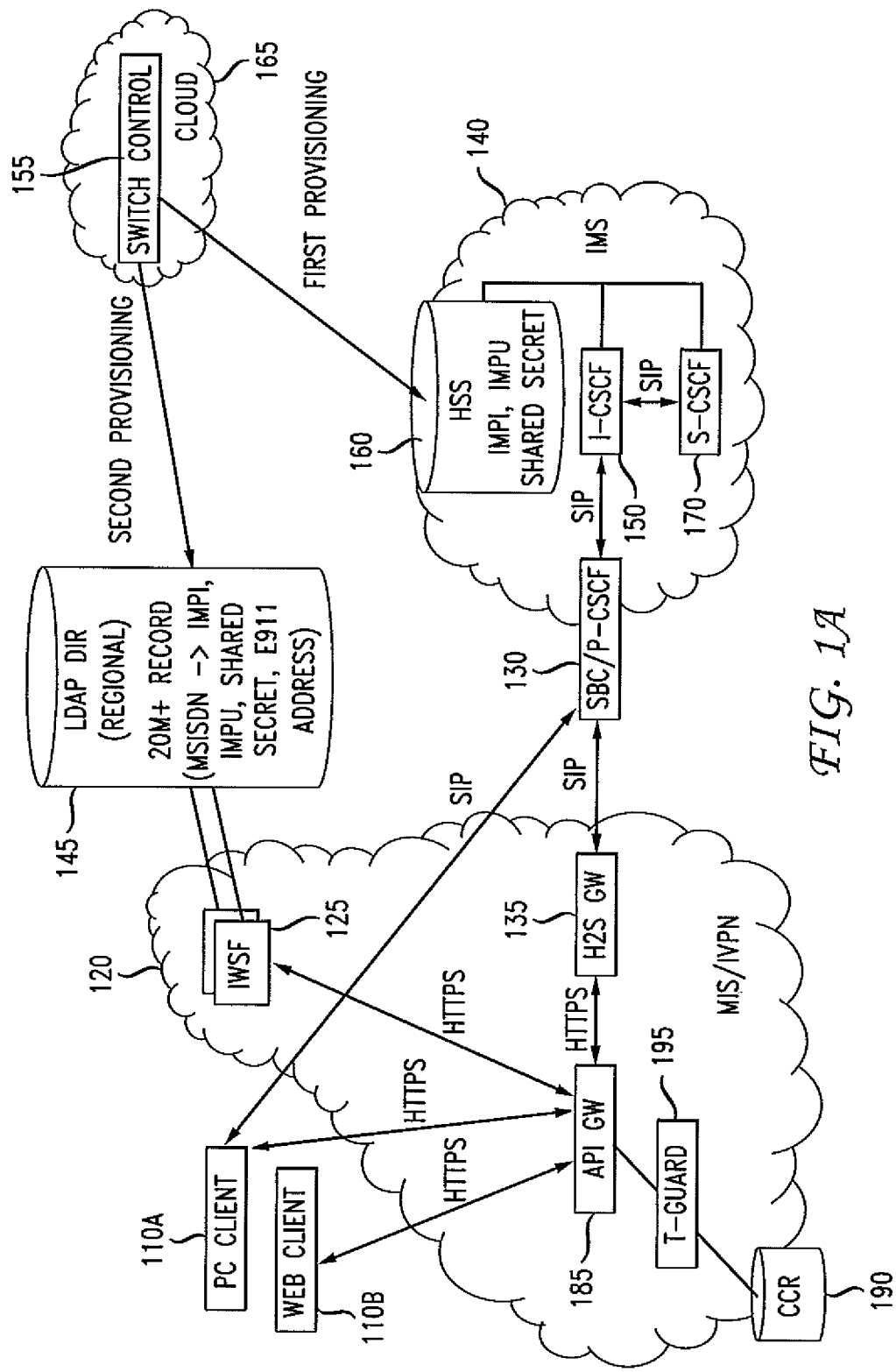
FIG. 1A illustrates a conventional system for non-SIM based authentication of a communication device.

To understand the complexity of conventional non-SIM based authentication of a communication device, FIG. 1A illustrates a conventional system in which non-SIM based communication devices are authenticated to access the IMS.

Referring to FIG. 1A, communication devices, such as a personal computer (PC) client device 110A and a web client device 110B, collectively referred to herein as client communication devices, desire to access the IMS 140. Before access may be granted, the HSS 160, which is included in the IMS 140, is provisioned with an IMPI, and IMPU, and a shared secret key, e.g., an Authentication and Key Agreement (AKA) key. Also, a Lightweight Directory Access Protocol (LDAP) Directory 145, which is included in a IP backbone network 120 managed by a central bandwidth broker (CBB), is provisioned with the IMPI, the IMPU, the shared secret key, and other information, such as an E911 address. This information is mapped to an MSISDN. Provisioning may be performed by a switch control 155 residing in the cloud computing network 165.

The IP backbone network 120 may be provided as a managed internet service (MIS) and/or an IP based virtual private network (IVPN), such as AT&T's virtual private network (AVPN). The IP backbone network 120 includes an application programming interface gateway (API GW) 185 that exchanges HTTPS requests and responses with the client communication devices 110A and 110B. The API GW 185 is, in turn, in communication with an authentication device, T-Guard 195, which in turn has access to a Common Customer Repository (CCR) database 190. The CCR database 190 is a centralized user database that contains information such as MSISDN, usernames, passwords, customer calling plans, account features, account standing, etc. The T-Guard 195 may be implemented with IBM Tivoli architecture. The T-Guard 195, in conjunction with the CCR database 190, authenticates a username and a password provided by the client communication devices 110A and 110B and maps the password to the MSISDN, as described in further detail below with reference to FIG. 1B.

The API GW 185 also exchanges HTTPS requests and responses with an internet web security device, referred to herein as an Internet Web Security Function (IWSF) 125. The IWSF 125 maps the MSISDN to the IMPI and the IMPU and composes a challenge response based on the secret key stored in the LDAP Dir 145. This is also described in further detail below with reference to FIG. 1B.

In addition, the API GW 185 exchanges HTTPS requests and responses with an HTTPS-to-SIP gateway (H2S GW) 135 included within the IP backbone network 120. The H2S GW 135 translates HTTPS messages used by the web based client communication device 110B into SIP messages used by the IMS 140. The H2S GW 135, in turn, exchanges SIP messages with the SBC/P-CSC 130 included in the IMS 140.

The client communication devices 110A and 110B also exchange SIP messages with the IMS network 140 to obtain access to the IMS network 140. The IMS network 140 includes Call State Control Functions (CSCFs), including a Session Border Control/Proxy-CSCF (SBC/P-CSCF) 130, an Interrogating-CSCF (I-CSCF) 150, and a Serving-CSCF (S-CSCF) 170.

The SBC/P-CSCF 130 is the first contact point in the IMS network 140 for the client communication devices 110A and 110B. The SBC/P-CSCF 130 receives SIP registration requests from the communication devices 110A and 110B, including the IMPI and IMPU obtained from the components of the IP backbone network 120, and sends challenge responses to the communication devices 110A and 110B as explained in further detail below with reference to FIG. 1B.

The SBC/P-CSCF 130 routes SIP communications to the I-CSCF 150. The I-CSCF 150, in turn, routes SIP communications to the S-CSCF 170. The I-CSCF 150 and the S-CSCF 170 are in communication with the HSS 160 for authenticating the communication devices 110A and 110B, as described in further detail below with reference to FIG. 1B.

Figure 1B:
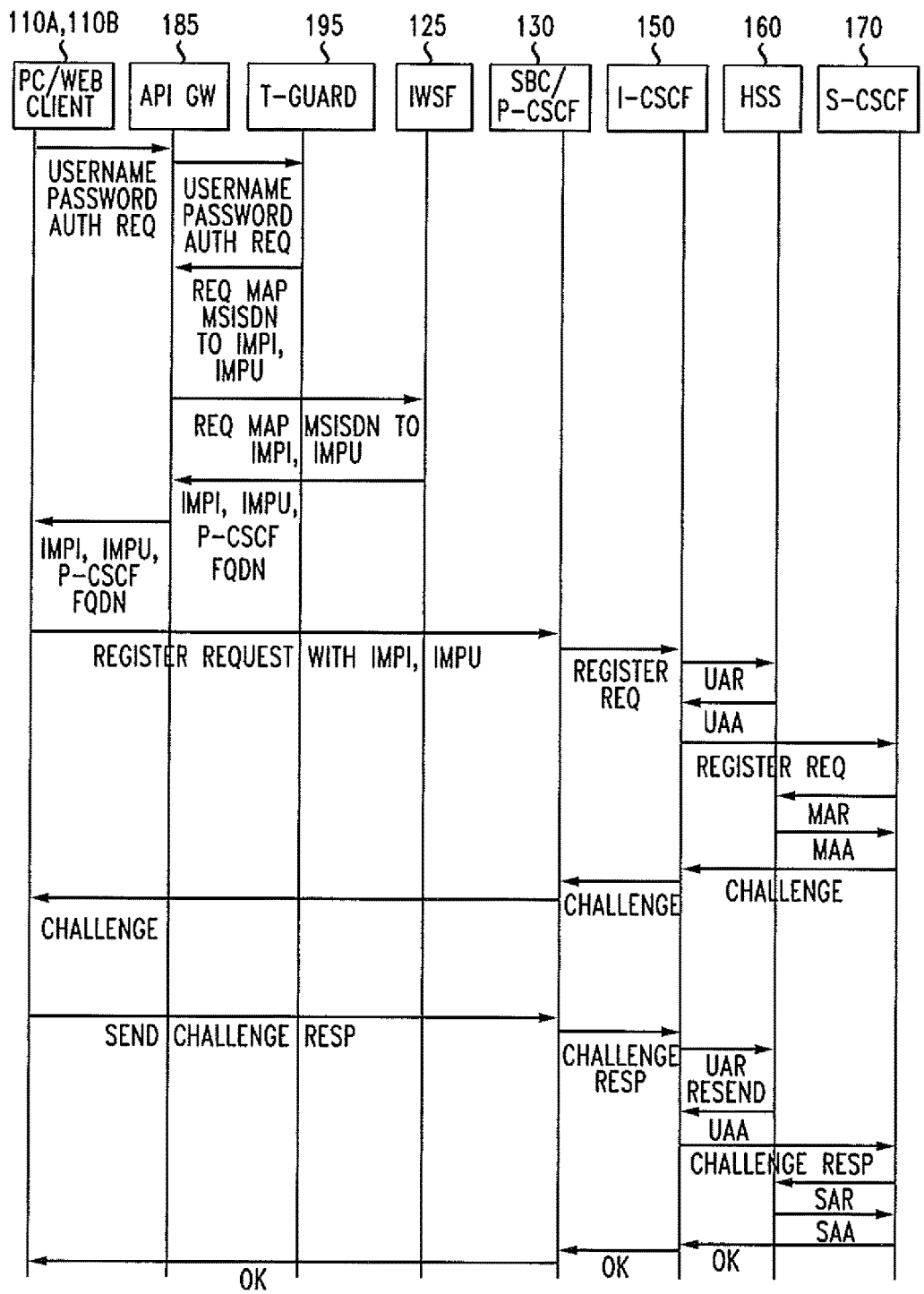
FIG. 1B is a flow diagram of a conventional process for non-SIM based authentication of a communication device.

Now to further understand the intricacies involved in the conventional authentication of a non-SIM based communication device for accessing an IMS network, reference is made to FIG. 1B.

FIG. 1B is a flow diagram of a conventional process for non-SIM based authentication of a communication device. As shown in FIG. 1B, authentication begins with the client communication devices 110A and/or 110B sending an HTTPS request to the API GW 185, requesting authentication of information associated with the client communication devices 110A and/or 110B. The API GW 185 communicates the request to the T-Guard 195. The T-Guard 195 attempts to authenticate the client communication devices 110A 110B by matching the username and passwords provided by the devices 110A and 110B with the usernames and corresponding passwords stored in the CCR 190. If the authentication is successful, the T-Guard 195 looks up the corresponding MSISDN stored in the CCR 190 and sends an HTTPS request, via the API GW 125, to the IWSF 125 to map the MSISDN to an IMPI and an IMPU.

The IWSF 125 maps the MSISDN to an IMPI, an IMPU and a temporary secret key based on the shared secret key stored in the LDAP Dir 145. The temporary secret key is cryptographically derived from the shared secret key. The IWSF 125 shared secret key is pre-provisioned in IWSF 125 and in the HSS 160.

The IWSF 125 sends an HTTPS response to the API GW 185. The HTTPS response includes the IMPI, the IMPU, the temporary secret key, and a P-CSCF fully qualified domain name (FQDN). The IWSF 125 does not send the actual secret key in the HTTPS response. The API GW 185, in turn, relays this HTTPS response to the client communication devices 110A and/or 110B so that the devices 110A and/or 110B can initiate a connection with the SBC/P-CSCF 130 via the H2S GW 135.

Next, the client communication devices 110A and/or 110B send a SIP registration request, including the IMPI and IMPU, to the SBC/P-CSCF 130. The SBC/P-CSCF 130 is not aware that the client communication devices are PC/web-based devices. To the SBC/P-CSCF 130, the client communication devices appear as SIM-based devices that store IMPIs, IMPUs, and a shared secret key.

The SBC/P-CSCF 130, in turn, relays the SIP request to the I-CSCF 150. The I-CSCF 150 sends a user authentication request (UAR) to the HSS 160, and the HSS 180 responds with a user authentication answer (UAA) indicating S-CSCF capabilities.

The I-CSCF 150 then sends an SIP message including a registration request to the S-CSCF 170. The S-CSCF 170 sends a multi-media authentication request (MAR) to the HSS 160. The HSS 160 responds to the S-CSCF 170 with a multi-media authentication answer (MAA), including a request for authentication information, e.g., the shared secret key, such as the AKA key. The S-CSCF 170, in turn, sends a SIP message including a challenge response for the authentication information to the I-CSCF 150.

The I-CSCF 150 forwards the challenge response as an SIP message to the SBC/P-CSCF 130, and the SBC/P-CSCF 130 forwards the challenge response as an SIP message to the client communication devices 110A and/or 110B.

The client communication devices 110A and/or 110B, having obtained the temporary secret key from the IWSF 125, send a challenge response as an SIP message to the SBC/P-CSCF 130. The challenge response includes the temporary secret key. The SBC/P-CSCF 130 forwards the challenge response to the I-CSCF 150. The I-CSCF 150 sends a UAR resend request to the HSS 160, including the temporary secret key. The temporary secret key is matched with a temporary secret key cryptographically derived from the secret key stored in the HSS 160. As noted above, the secret key is pre-provisioned in the HSS 160. The HSS 160 responds with the UAA. The I-CSCF 150 then sends the challenge response as an SIP message to the S-CSCF 170.

The S-CSCF 170 sends a server assignment request (SAR) to the HSS 160, confirming that the user of the communication devices 110A and/or 110B is authenticated. The HSS 160 responds with a server assignment answer (SAA) including a service profile.

After receiving the SAA, the S-CSCF 170 sends an SIP message including an OK response to the I-CSCF 150, and the I-CSCF 150 relays this SIP message to the SBC/P-CSCF 130. The SBC/P-CSCF 130, in turn, relays this SIP message to the client communication devices 110A and/or 110B. At this point, the client communication decides 110A and/or 110B that sent the initial registration request are authenticated and are allowed access to the IMS 140.

As can be seen from FIGS. 1A and 1B, the conventional process for authenticating a non-SIM based client device for accessing the IMS network is complex. This complexity results in undesirable latency. According to an exemplary embodiment, the authentication process is made straightforward and faster by alleviating the need for authentication of a secret key and the protection of the IMPI.

Figure 2A:
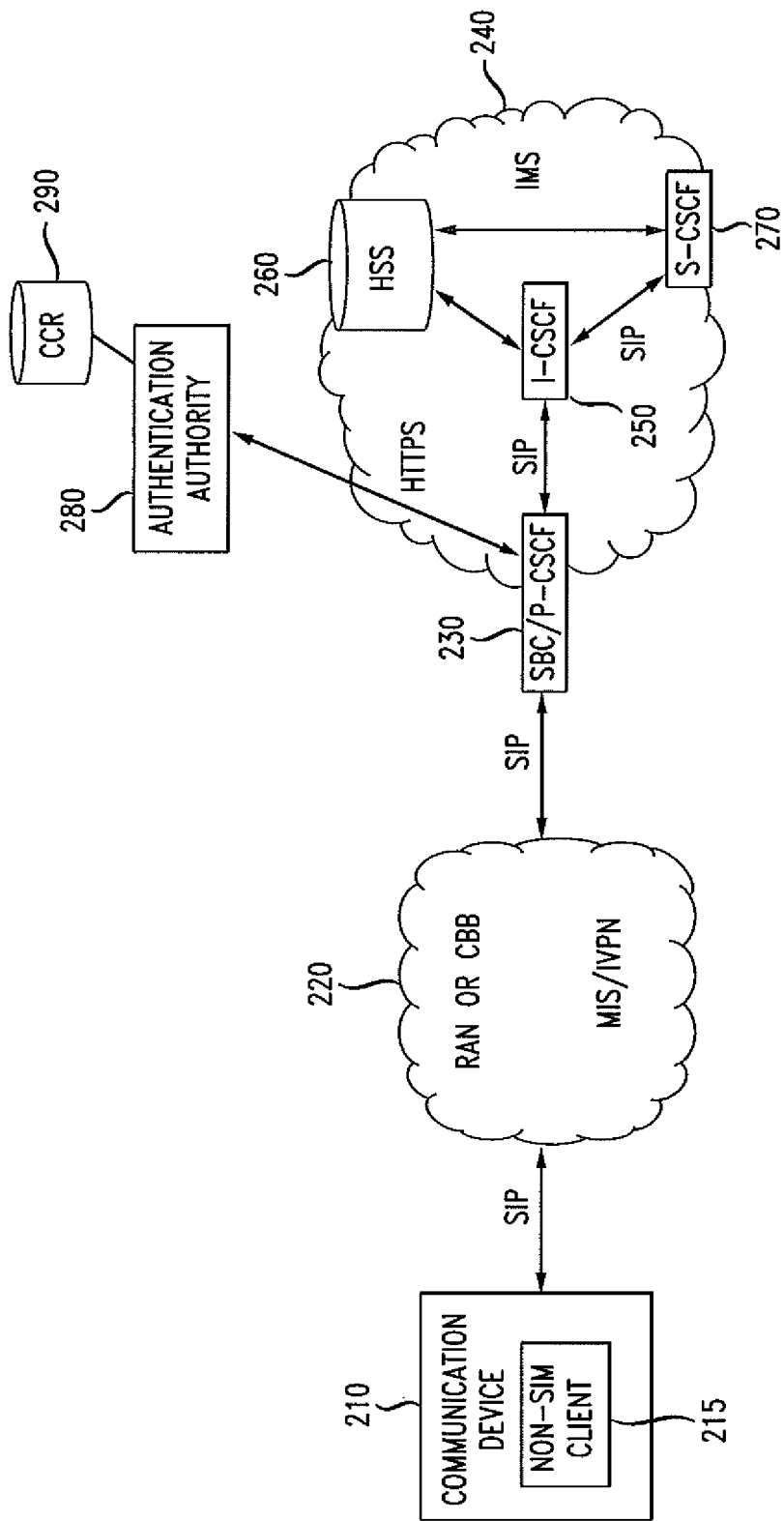
FIG. 2A illustrates a system for non-SIM based authentication of a communication device according to an illustrative embodiment.

FIG. 2A illustrates a system for non-SIM based authentication of a communication device according to an illustrative embodiment. As shown in FIG. 2A, a communication device 210, such as a laptop, public kiosk, or any other communication device contains a non-SIM based client 215, such as a soft client or any other non SIM-based client. The soft client and non SIM-based clients may be implemented as applications (implemented as computer-readable instructions) with which the communication device 210 communicates with the IMS network 240. Although only one communication device 210 is shown for ease of illustration, it should be appreciated that the concept described herein may be applicable to any number of communication devices containing non-SIM clients. Also, while the communication device 210 is described as including a non-SIM based client 215, and the device 210 is referred to herein as a non-SIM client communication device, it should be appreciated that the concepts described herein may be applicable to a SIM-based device, e.g., a smartphone, using a soft client or a non-SIM based client to communicate, such that the SIM card is not used by the device for registration of the soft client or non-SIM based client.

The non-SIM client communication device 210 communicates with the IMS 240 via a radio access network (RAN) and/or components of IP backbone 220, such as H25-GW. Similar to the IP backbone 120, the IP backbone 240 may include a CBB and may be provided as a MIS and/or an IVPN, such as an AVPN. For ease of explanation, the description below is directed to a client communication device communicating with the IMS 240 via a RAN, such as a RAN for a 3GPP network.

The non-SIM client communication device 210 exchanges SIP messages with the IMS 240 via the RAN/IP Backbone 220 in order to authenticate the non-SIM client communication device 210 to allow it to access the IMS 240. In particular, the non-SIM client communication device 210 sends SIP communications to the SBC/P-CSCF 230. The SBC/P-CSCF 230 receives SIP registration requests from the non-SIM client communication device 210, including an Internet protocol identity.

According to illustrative embodiments, the internet protocol identity is not an IMPI. Rather, the internet protocol identity may include any information that may be matched with authentication information. For example, the internet protocol identity may include a username. The internet protocol identity may be dynamically assigned to the non-SIM client communication device 210, e.g., by a user entering the internet protocol identity manually or directing the non-SIM client communication device to retrieve the internet protocol identity from a file stored, e.g, on a key-fob.

The SBC/P-CSCF 230 routes SIP communications to the I-CSCF 250. The I-CSCF 250, in turn, routes SIP communications to the S-CSCF 270. The I-CSCF 250 and the S-CSCF 270 are in communication with the HSS 260 for authenticating the non-SIM client communication device 210, as described in further detail below with reference to FIG. 2B.

Similar to the HSS 160 shown in FIG. 1A, the HSS 260 is provisioned with information relating to users of communication devices desiring to access the IMS network, such as IMPIs, IMPUs, and authentication information, e.g., an authentication key and/or information indicative of an authentication method, associated with each IMPI. The authentication information may include, e.g., a shared secret key, biometric data, a password, etc.

According to an illustrative embodiment, the SBC/P-CSCF 230 also exchanges HTTPS messages with an Authentication Authority 280. The Authentication Authority 280 includes authentication information associated with the Internet protocol identity, such as a password, biometric information, etc. The Authentication Authority 280 obtains authentication information from the CCR database 290 for registering the non-SIM based communication device as described in further detail below with reference to FIG. 2B. The CCR database 290 contains information similar to that contained in the CCR database 190. The Authentication Authority may be pre-provisioned by, e.g., a user of the non-SIM based client communication device 210.

It should be appreciated that the Authentication Authority 280 is optional. According to an illustrative embodiment, connections between the non-SIM client communication device 210 and the SBC/P-CSCF 230 are possible, and the Authentication Authority 280 may only be needed if an authentication method being used by the non-SIM client communication device 210 is different than what is natively supported by the SBC/P-CSCF 230.

As can be seen from FIG. 2A, there are fewer components involved in authenticating a non-SIM client communication device, according to an illustrative embodiments, compared to the convention authentication of a non-SIM client communication device. For a deeper understanding of the simplification of the authentication process afforded by the concepts described herein, reference is made to FIG. 2B.

Figure 2B:
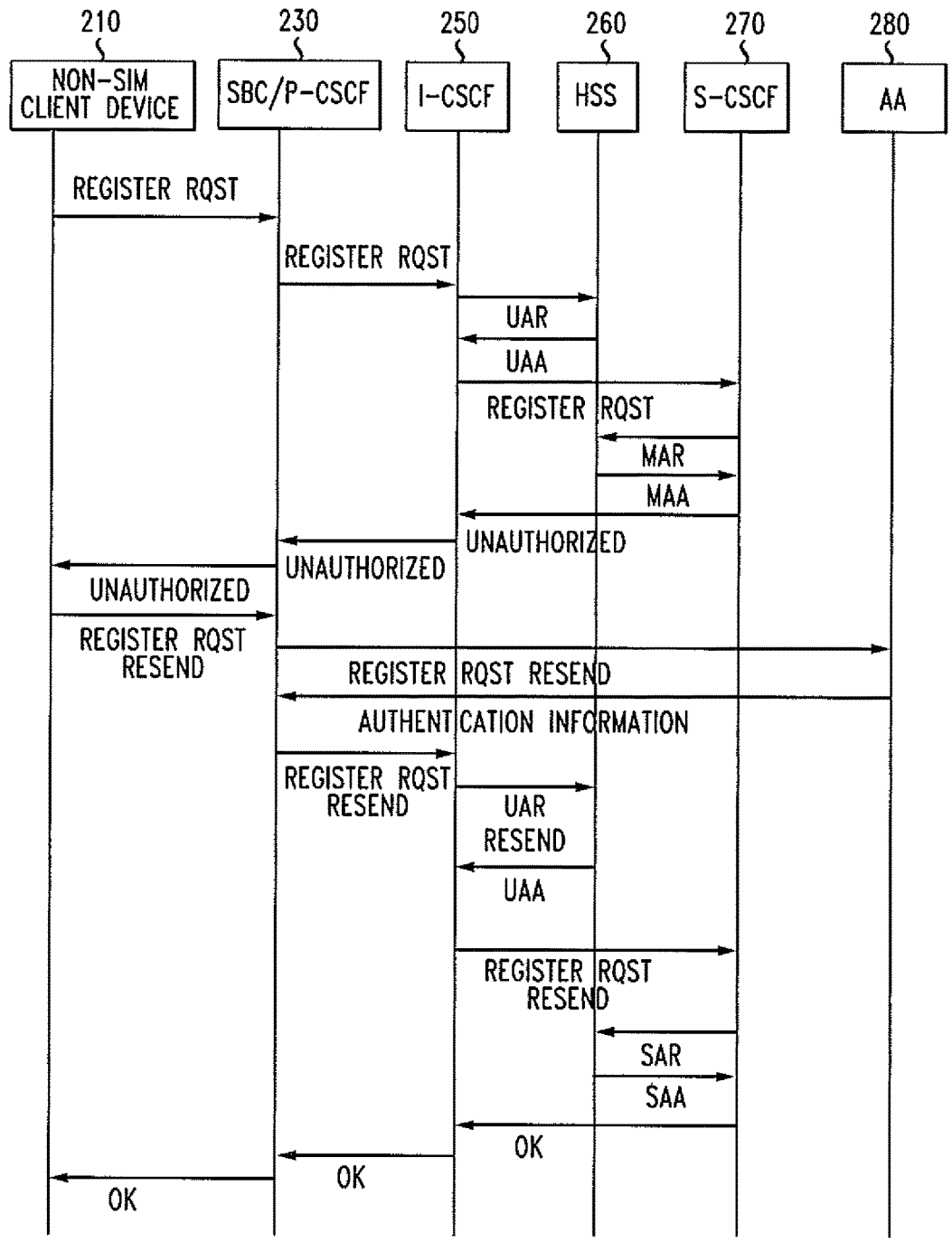
FIG. 2B is a flow diagram of a process for non-SIM based authentication of a communication device according to an illustrative embodiment.

FIG. 2B is a flow diagram of a process for non-SIM based authentication of a communication device according to an illustrative embodiment. The registration process begins with the non-SIM client communication device 210 sending a registration request as an SIP message to the SBC/P-CSCF 230 via, e.g., the RAN 220 (not shown in FIG. 2B for simplicity of illustration). The registration request includes the internet protocol identity associated with a user of the non-SIM client, such as a username. The SBC/P-CSCF 220, in turn, relays this SIP request to the I-CSCF 250.

The I-CSCF 250 sends a user authentication request (UAR) to the HSS 260. The HSS 260 responds with a user authentication answer (UAA) indicating S-CSCF capabilities.

The I-CSCF 250 then sends an SIP message including the registration request to the S-CSCF 270. The S-CSCF 270 sends a multi-media authentication request (MAR) to the HSS 260. The HSS 260 responds to the S-CSCF 270 with a multi-media authentication answer (MAA), asking for authentication information. As noted above, the IMPI's stored in the HSS 260 are each linked to an authentication method and/or key, and the HSS 260 also stores a corresponding password or other authentication credentials. At this stage, the HSS 260 verifies that an IMPI exists and what sort of authentication information is linked to the IMPI. The S-CSCF 270, in turn, sends a response indicating that the non-SIM client communication device 210 is unauthorized as a SIP message to the I-CSCF 250.

The I-CSCF 250 forwards the unauthorized response as a SIP message to the SBC/P-CSCF 230, and the SBC/P-CSCF 230 forwards the unauthorized response as an SIP message to the non-SIM client communication device 210.

Upon receipt of the unauthorized response, the non-SIM client communication device 210 sends a register resend request to the SBC/P-CSCF 230 as a SIP message. The register resend request includes the internet protocol identity sent initially, along with authentication information. As the non-SIM client communication device 210 does not use a SIM card to store authentication information, the authentication information that is sent includes authentication information associated with the internet protocol identity, such as a password or biometrically sensed information, that is entered by a user of the non-SIM client communication device 210, e.g., responsive to a prompt.

The SCB/P-CSCF 230 receives the register resend request and sends it to the AA 280 as an HTTPS message. The AA 280 sends a response with the authentication information, e.g., the password and/or the biometric information associated with the internet protocol identity, as an HTTPS message to the SBC/P-CSCF 230.

The SBC/P-CSCF 230 sends a register resend request to the I-CSCF 250, including the obtained authentication information. The I-CSCF 250 sends a UAR resend request to the HSS 260, and, if the authentication information matches what is stored in the HSS 260, the HSS 260 responds with the UAA. The I-CSCF 250 then sends the register resend request as an SIP message to the S-CSCF 270.

The S-CSCF 270 sends a server assignment request (SAR) to the HSS 260, confirming that the user of the communication device 210 is authenticated. The HSS 260 responds with a server assignment answer (SAA) including a service profile. In this way, the S-CSCF determines that the non-SIM client communication device 210 is authorized to access the IMS network.

After receiving the SM, the S-CSCF 270 sends an SIP message including an OK response toe the I-CSCF 250, and the I-CSCF 250 relays this SIP message to the SBC/P-CSCF 230. The SBC/P-CSCF 230, in turn, relays this SIP message to the communication device 210. At this point, the non-SIM client communication device 210 that sent the initial registration request is authenticated and is allowed access to the IMS 240.

As can be seen from FIGS. 2A and 2B, the authentication process for allowing access of a non-SIM based client to an IMS network, according illustrative embodiments, is much simpler than the conventional approach. According to illustrative embodiments, there is no need to store an IMPI, an IMPU, and a shared secret key in the non-SIM client communication device 210. Rather, an Internet protocol identity, such as a username, may be dynamically assigned to the communication device, and authentication information may be entered on-the-fly by a user.

Because the internet protocol identity is not tied to the non-SIM client communication device 210 but is dynamically assigned, the internet protocol identity is portable among a plurality of communication devices, irrespective of carriers associated with the communication devices. Thus, for example, the user may use the internet protocol identity to access the IMS network 240 from his or her own laptop, a public kiosk, such as a kiosk in an airport, hotel, or library, or any other device equipped with a soft client or non-SIM based client.

According to one embodiment, there may be multiple internet protocol identities associated with the same user. For example, a user may have internet protocol identities for work, home, and personal user. Since the Internet protocol identity is dynamically assigned to a communication device when the user desires access to the IMS network 240, the user may use any of these interment protocol identities on any communication device having a non-SIM based client. For example, a user may use an internet protocol identity associated with work, along with a password, to access an application to check work emails from a public kiosk in an airport. Then, the user may change to another device or use the same public kiosk and enter an internet protocol identity associated with personal use, along with a password, to access a gaming application.

According to another embodiment, since the internet protocol identity is not tied to a communication device, multiple users may use the device at the same time. For example, a first user may enter his or her internet protocol identity and password to access the IMS network 240 on a laptop, and another user may enter his or her internet protocol identity and password to access the IMS network 240 on the same laptop.

According to yet another embodiment, the authentication information associated with an internet protocol identity may include multiple types of information. For example, fi the internet protocol identity is a username, the authentication information may include a password, biometric information, etc. Thus, if a user forgets one type of authentication information, alternative authentication information may be used to authenticate the user.

Figure 3:
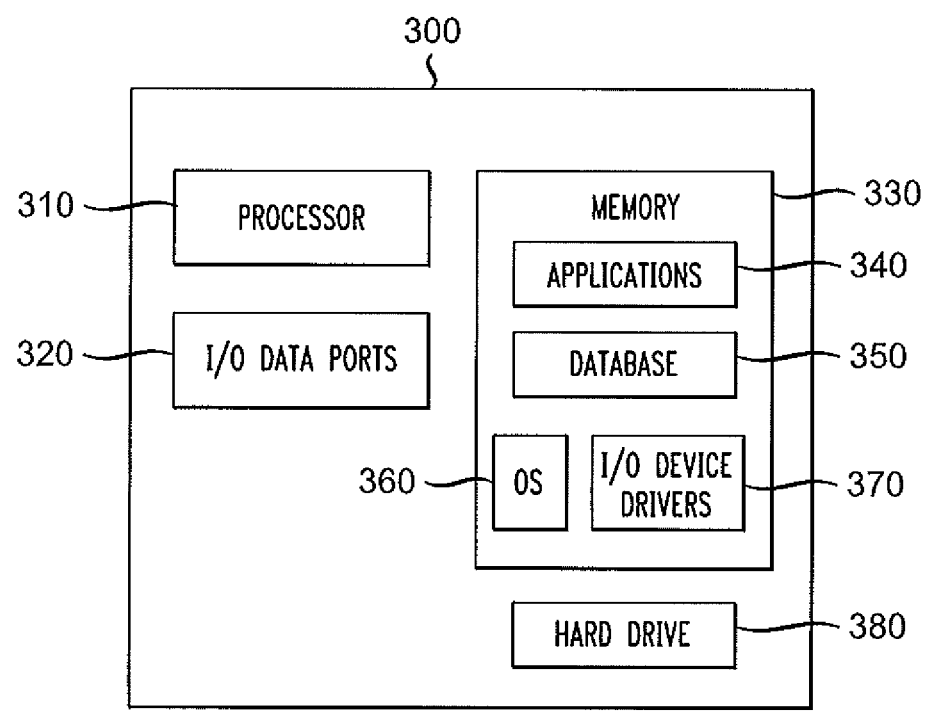
FIG. 3 is a block diagram of a computing device for non-SIM based authentication of a communication device according to an illustrative embodiment.

FIG. 3 is a block diagram of a computing device, such as the S-CSCF 270, for authenticating a non-SIM client communication device according to an illustrative embodiment. Although no connections are shown between the components illustrated in FIG. 3, those skilled in the art will appreciate that the components can interact with each other via any suitable connections to carry out device functions.

It should be understood that FIG. 3 and the following description are intended to provide a brief, general description of a suitable environment in which the various aspects of some embodiments of the present disclosure can be implemented. While the description includes a general context of computer-executable instructions, the present disclosure can also be implemented in combination with other program modules and/or as a combination of hardware and software in addition to, or instead of, computer-readable instructions.

The term "application", or variants thereof, is used expansively herein to include routines, program modules, program, components, data structures, algorithms, and the like. Applications can be implemented on various system configurations, including single-processor or multiprocessor systems, minicomputers, mainframe computers, personal computers, handheld-computing devices, microprocessor-based, programmable consumer electronics, combinations thereof, and the like. The terminology "computer-readable media" and variants thereof, as used in the specification and claims can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that can be used to store information that can be accessed by the components shown in FIG. 3, excluding propagating signals.

According to an illustrative embodiment, the computing device 300 may be implemented in any suitable computing device having a connection to the HSS 260 and the I-CSCF 250.

Referring to FIG. 3, the computing device 300 includes a processor 310 that receives a registration request from a communication device, e.g., the communication device 210, via the SBC/P-CSCF 230 and the I-CSCF 250. The processor 310 exchanges information with the HSS 260, such as the MAR and the MAA, and sends an authorized response to the non-SIM client communication device via the I-CSCF 250 and the SBC/P-CSCF 230. The processor 310 may also receive a registration resend request from the non-SIM client communication device 210, via the SBC/P-CSCF 230 and the I-CSCF 250, exchange information with the HSS 260, such as the SAR and the SAA, and send an OK response to the communication device 210 via the I-CSCF 250 and the SBC/P-CSCF 230. The messages exchanged between the S-CSCF 270 and the I-CSCF 250 and the HSS 260 may be exchanged via the I/O data ports 320. The I/O data ports 320 can be implemented with, e.g., an interface including an antenna or other suitable type of transceiver through which data and signals may be transmitted and received wired and/or wirelessly.

The computing device 300 also includes a physical hard drive 380. The processor 310 communicates with the memory 330 and the hard drive 380 via, e.g., an address/data bus (not shown).

The processor 310 can be any commercially available or custom microprocessor. Additionally, although illustrated and described as one processor, the processor 310 may be implemented with multiple processors, which could include distributed processors or parallel processors in a single machine or multiple machines. Further, it should be appreciated that the processor can be used in supporting a virtual processing environment. Also, the processor may include a state machine, an application specific integrated circuit (ASIC), a programmable gate array (PGA) including a Field PGA, or a state machine.

The memory is 330 is representative of the overall hierarchy of memory devices containing the software and data used to implement the functionality of the device 300. The memory 330 may include, but is not limited to the following types of devices: processor registers, processor cache, RAM, ROM, PROM, EPROM, EEPROM, flash memory, SRAMD, DRAM, other volatile memory forms, and non-volatile, semi-permanent or permanent memory types; for example, tape-based media, optical media, solid state media, hard disks, combinations thereof, and the like, excluding propagating signals. As shown in FIG. 3, the memory 330 may include several categories of software and data used in the device 300, including applications 340, a database 350, an operating system (OS) 360, and input/output (I/O) device drivers 370.

The I/O device drivers 370 may include various routines accessed through at least one of the OS 360 by the applications 340 to communicate with devices and certain memory components.

The applications 340 can be stored in the memory 330 and/or in a firmware (not shown) as executable instructions, and can be executed by the processor 310 to perform operations. When the processor 310 executes instructions to perform "operations", this may include the processor performing the operations directly and/or facilitating, directing, or cooperating with another device or component to perform the operations. The applications 340 include various programs that implement the various features of the device 300. For example, the applications 340 may include applications for confirming whether or not the non-SIM client communication device 210 is authorized based on information sent received from the non-SIM client communication device 210 and information obtained from the HSS 260.

The database 350 represents the static and dynamic data used by the applications 340, the OS 360, the I/O device drivers 370 and other software programs that may reside in the memory. The database may 350 may be used to store information such a user service profile obtained from the HSS 260.

While the memory 330 is illustrated as residing proximate the processor 310, it should be understood that at least a portion of the memory 330 can be a remotely accessed storage system, including, for example, another server in communication with the processor 310 via the Internet, a remote hard disk drive, a removable storage medium, combinations thereof, and the like. Thus, any of the data, applications, and/or software described above can be stored within the memory 330 and/or accessed via network connections to other data processing systems (not shown) that may include a local area network (LAN), a metropolitan area network (MAN), or a wide area network (WAN), for example.

Although the details of the SBC/P-CSCF 230 and the I-CSCF 250 are not shown or described, it should be appreciated that these devices may be implemented with a computing device similar to that shown and described with reference to FIG. 3 for performing the various functions described above.

Also, although the details of the non-SIM client communication device 210 are not shown or described, it should be appreciated that the device 210 may include components for performing the functions described above, e.g., a database for storing an internet protocol identity and authentication information entered by a user, transceivers for communicating with the SBC/P-CSCF 230 and the Authentication Authority 280, a memory for storing applications, such as a client application, as computer-readable instructions for performing various functions, such as sending registration requests, prompting the user for authentication information, and reseeding a registration request, etc., and a processor for executing the applications.

In addition, although the description above has been geared towards concepts for authorizing communication devices for access to an IMS network via a 3GPP cellular network, it should be appreciated that these concepts may be extended to any network with which a communication device may communicate with the IMS network. Examples of such networks include but are not limited to a GSM network, a UMTS network, a Time Division Multiple Access (TDMA) network, a Frequency Division Multiple Access (F DMA) network, a Wideband Code Division Multiple Access (WCDMA) network, an Orthogonal Frequency Division Multiplexing (OFDM) network, and various other networks using 2G, 2.5G, 3G, 4G, and greater generation technologies. Examples of suitable data bearers include, but are not limited to GPRS, Long Term Evolution (LTE), Enhanced Data rates for Global Evolution (EDGE), Evolved Packet Switch (EPS) the High-Speed Packet Access (HSPA) protocol family, such as, High-Speed Downlink Packet Access (HSDPA), Enhanced Uplink (EUL) or otherwise termed High-Speed Uplink Packet Access (HSUPA), Evolved HSPA (HSPA+), and various other current and future data bearers. In addition, other types networks may be used, e.g., Wireless LAN (WLAN), WiFi, etc., either alone or in combination with the cellular networks.

The law does not require and it is economically prohibitive to illustrate and teach every possible embodiment of the present claims. Hence, the above-described embodiments are merely illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A method, comprising:
receiving, by a server, a session initiation protocol message associated with a SIMless client device lacking a subscriber identity module that stores authentication information, the session initiation protocol message requesting an authentication to access an Internet protocol multimedia subsystem, and the session initiation protocol message specifying a username associated with a user of the SIMless client device as an authentication credential for the access to the Internet protocol multimedia subsystem;
determining, by the server, that the SIMless client device is unauthorized for the access to the Internet protocol multimedia subsystem based on the username;
initiating, by the server, an unauthorized response message sent to the SIMless client device, the unauthorized response message indicating the SIMless client device is unauthorized for the access to the Internet protocol multimedia subsystem;
receiving, by the server, a register resend request sent from the SIMless device in response to the unauthorized response message, the register resend request formatted as another session initiation protocol message, the register resend request specifying the username and biometric information entered by the user in lieu of a key;
sending, by the server, a user authentication request to a home subscriber server, the user authentication request formatted as the session initiation protocol message and comprising the biometric information specified by the register resend request;
receiving, by the server, a response formatted as the session initiation protocol message, the response indicating that the biometric information matches an entry stored by the home subscriber server; and
determining, by the server, that the SIMless client device is authorized for the access to the Internet protocol multimedia subsystem based on the response formatted as the session initiation protocol message;

wherein the biometric information allows the SIMless client device to access the Internet protocol multimedia subsystem in lieu of the key.

2. The method of claim 1, further comprising prompting for the authentication information.

3. The method of claim 1, further comprising receiving the username manually entered by the user of the SIMless client device.

4. The method of claim 1, further comprising determining a match between the biometric information and an authentication database.

5. The method of claim 1, further comprising determining a match between a password and entries in an authentication database.

6. The method of claim 1, further comprising sending the register resend request.

7. A system, comprising:
a processor; and
a memory device, the memory device having stored thereon instructions which, when executed by the processor, cause the processor to perform operations comprising:
receiving a session initiation protocol message associated with a SIMless client device lacking a subscriber identity module, the session initiation protocol message requesting an authentication to access an Internet protocol multimedia subsystem, and the session initiation protocol message specifying a username as an authentication credential;
determining that the SIMless client device is unauthorized for the access to the Internet protocol multimedia subsystem based on the username;
initiating an unauthorized response message sent to the SIMless client device, the unauthorized response message indicating the SIMless client device is unauthorized for the access to the Internet protocol multimedia subsystem;
receiving a register resend request sent from the SIMless device in response to the unauthorized response message, the register resend request formatted as the session initiation protocol message, the register resend request specifying the username and biometric information entered by the user in lieu of a key;
sending a user authentication request to a home subscriber server, the user authentication request formatted as the session initiation protocol message and comprising the biometric information specified by the register resend request;
receiving a response formatted as the session initiation protocol message, the response indicating that the biometric information matches an entry stored by the home subscriber server; and
determining that the SIMless client device is authenticated for the access to the Internet protocol multimedia subsystem based on the response formatted as the session initiation protocol message;
wherein the biometric information allows the SIMless client device to access the Internet protocol multimedia subsystem in lieu of the key.

8. The system of claim 7, wherein the operations further comprise prompting for the biometric information.

9. The system of claim 7, wherein the operations further comprise receiving the username manually entered by the user of the SIMless client device.

10. The system of claim 7, wherein the operations further comprise determining a match between the biometric information and the entry stored by the home subscriber server.

11. A computer readable storage device having instructions stored thereon which, when executed by a processor, cause the processor to perform operations comprising:
receiving a session initiation protocol message associated with a SIMless client device lacking a subscriber identity module, the session initiation protocol message requesting an authentication for the SIMless client device to access an Internet protocol multimedia subsystem, and the session initiation protocol message specifying a username as an authentication credential for the access to the Internet protocol multimedia subsystem;
determining that the SIMless client device is unauthorized for the access to the Internet protocol multimedia subsystem based on the username;
initiating an unauthorized response message sent to the SIMless client device, the unauthorized response message indicating the SIMless client device is unauthorized for the access to the Internet protocol multimedia subsystem;
receiving a register resend request sent from the SIMless device in response to the unauthorized response message, the register resend request formatted as the session initiation protocol message, the register resend request specifying the username and a biometric information entered by the user in lieu of a key;
sending a user authentication request to a home subscriber server, the user authentication request formatted as the session initiation protocol message and comprising the biometric information specified by the register resend request;
receiving a response formatted as the session initiation protocol message, the response indicating that the biometric information matches an entry stored by the home subscriber server; and
determining that the SIMless client device is authenticated for the access to the Internet protocol multimedia subsystem based on the response formatted as the session initiation protocol message;
wherein the biometric information allows the SIMless client device to access the Internet protocol multimedia subsystem in lieu of the key.

12. The computer readable storage device of claim 11, wherein the operations further comprise prompting for the biometric information.

13. The computer readable storage device of claim 11, wherein the operations further comprise determining a match between the biometric information and the entry stored by the home subscriber server.

* * * * *